US010724286B2

(12) United States Patent
Rissone

(10) Patent No.: US 10,724,286 B2
(45) Date of Patent: Jul. 28, 2020

(54) STRUCTURING FOR CUSHIONING DEADBOLT AND/OR LATCH AT DOOR FRAME

(71) Applicant: Robert Rissone, Rochester, NY (US)

(72) Inventor: Robert Rissone, Rochester, NY (US)

( * ) Notice: Subject to any disclaimer, the term of this patent is extended or adjusted under 35 U.S.C. 154(b) by 1040 days.

(21) Appl. No.: 14/978,249

(22) Filed: Dec. 22, 2015

(65) Prior Publication Data

US 2016/0177611 A1 Jun. 23, 2016

Related U.S. Application Data

(60) Provisional application No. 62/095,377, filed on Dec. 22, 2014.

(51) Int. Cl.

| | |
|---|---|
| ***E05C 19/00*** | (2006.01) |
| ***E05F 5/02*** | (2006.01) |
| ***F16F 7/00*** | (2006.01) |
| ***E05B 15/02*** | (2006.01) |
| ***E05F 5/08*** | (2006.01) |
| ***E05B 17/00*** | (2006.01) |

(52) U.S. Cl.

CPC .............. *E05F 5/02* (2013.01); *E05B 15/025* (2013.01); *E05B 17/0041* (2013.01); *E05B 17/0045* (2013.01); *E05F 5/08* (2013.01); *E05Y 2900/132* (2013.01)

(58) Field of Classification Search

CPC .......... E05F 5/02; E05F 5/08; E05B 17/0041; E05B 15/025; E05B 17/0045; E05Y 2900/132

See application file for complete search history.

(56) References Cited

U.S. PATENT DOCUMENTS 2,587,037 A * 2/1952 Glubiak ................ E05B 63/003 70/414
3,301,335 A * 1/1967 Snelling .................... B25C 1/14 173/162.1
3,346,221 A * 10/1967 Farmer ...................... C08J 9/42 174/544
4,045,065 A * 8/1977 Johnson .................. E05B 63/24 292/341.12

(Continued)

OTHER PUBLICATIONS

U.S. Appl. No. 62/095,377, filed Dec. 22, 2014; Rissone.

*Primary Examiner* — Kristina R Fulton
*Assistant Examiner* — Thomas L Neubauer
(74) *Attorney, Agent, or Firm* — Nixon & Vanderyhe P.C.

(57) ABSTRACT

A deadbolt cushioning system includes: a deadbolt cushioning structure attached to a door frame so that when a door with a fully extended deadbolt closes from a wide open position toward a closed position the extended deadbolt impacts the deadbolt cushioning structure. The deadbolt cushioning structure for preventing the extended deadbolt from impacting the door frame and for preventing the extended deadbolt from impacting a strike plate attached to the door frame. The deadbolt cushioning structure may include at least first and second telescoping housings with a biasing structure (e.g., foam and/or spring) provided therebetween. When the deadbolt impacts the deadbolt cushioning structure the biasing structure compresses and the second housing slides relative to the first structure and moves toward the face of the door frame to which the first housing is affixed.

21 Claims, 22 Drawing Sheets

(56) References Cited

U.S. PATENT DOCUMENTS

| | | | | |
|---|---|---|---|---|
| 6,058,654 | A | 5/2000 | Rissone | |
| 6,244,636 | B1 | 12/2001 | Rissone | |
| 8,209,909 | B2 | 7/2012 | Rissone | |
| 9,895,969 | B2 * | 2/2018 | Alexander | B60K 15/05 |
| 2011/0067205 | A1 * | 3/2011 | Wing | E05F 5/06 16/86 A |

* cited by examiner

STRUCTURING FOR CUSHIONING DEADBOLT AND/OR LATCH AT DOOR FRAME

This application claims priority on U.S. provisional application No. 62/095,377, filed Dec. 22, 2014, the disclosure of which is hereby incorporated herein by reference in its entirety.

BACKGROUND AND SUMMARY

A door frame has a mortise or recess that accepts a strike plate, that is typically made of metal, in the rabbet of the frame. When a door closes, the strike plate accepts or receives, and retains, the latch and the deadbolt from the lockset that is mortised into the door. Either or both can secure the door in place for the purpose of, for example, protection from smoke/fire and/or security.

As a door closes into the locked or latched position, the latch on the edge of the door meets what is often a curved lip on the strike plate. However, some strike plates have no curved lip, and that have a lip that is simply straight with no curve. The lip of the strike plate often extends above the face of the frame. The lip allows the latch to begin to retract and facilitates or eases the engagement of the door in to the frame. This point of engagement, or contact, can produce a noticeable metal sound. It can be dramatically accentuated if the frame is metal and/or if a metal frame is hollow inside and does not have a solid material such as mortar filling the cavity.

Moreover, improper or inconsistent installation of frames and doors can adversely affect the security of the intended closing and latching. The frames may be set too tightly or too loosely. Any of the three sides of a frame can possibly be twisted, which further hinders the ease of the closing and latching of the door. This can affect the security and/or the safety of the door opening if the door does not close easily and completely. Any condition that inhibits the ease of closing and latching usually results in a field fix of making adjustments on the spring hinges or door closers that make them close faster and slam shut. This increases the undesirable noise of a metal latch hitting a frame that can also be metal.

Manufacturers of locksets sometimes provide the strike plate which is to be installed in the rabbet of the door frame. Lips of the strike plate, which lips are oriented so as to face the closing door, can have different heights and different profiles such as different profiles of curved lips. Manufacturers of locksets also have latches extending out of the lockset, on the edge of the door, that have different angles.

For example, it may be desirable for the guest entry door in a hotel to be self-closing and self-latching to meet fire code. These doors may also self-lock and some may have automatic deadbolts that engage when the door enters a latched position. Moreover, some deadbolts are manually engaged (e.g., extended) from the inside of a door by a user turning a thumb turn on the inside face of the trim plates or face of the door. When a deadbolt is extended before a door is closed, and then the door is closed, it can cause an extremely loud banging noise when the deadbolt hits the lip of the strike plate and/or the frame. It is also noted that for some locks that have automatic extension of a deadbolt, one can activate the deadbolt before the door closes by depressing a secondary latch in the bottom of the edge of the lock. People often like to extend the deadbolt (sometimes known as "throwing the deadbolt") so that they can prop the door open to perhaps get ice or sometimes to simply leave it open in case they want to go back into a room at some point. Maids in hotels also tend to throw the deadbolt to hold doors open when a hotel room is being cleaned.

A problem is that the deadbolt can slam against the face of the frame and/or against the lip of a strike plate, and make a loud sound and possibly damage structure. The lip of the strike plate is often located beyond/above the frame. This can cause guest noise complaints in hotels concerning slamming doors. It can also damage the core of a door because it puts increased torque on the screws holding the lock inside the edge mortise of the door. If the door and/or frame is wood, it can also split the edge of the door and/or damage a wood frame. If the door is metal it can bend the tap plates that secure the lock body in the mortise. It can also damage the electronics of locksets.

It will be appreciated from the above that there exists a need in the art for addressing noise and/or damage issue when doors with extended deadbolts are shut, closed, or the like. It may be desirable to quiet the sound of an extended deadbolt when it is closed on a door frame and/or strike plate. It may be also desirable to quiet the sound of the engagement of a metal latch when it hits the metal strike plate. It may also be desirable to address variations in strike plates with respect to variations in strike lip profiles and/or variations of angles of lock latches.

Accordingly to example embodiments of this invention, a structure may be provided for cushioning an extended deadbolt of a door when the door with the extended deadbolt is moved from an open position to a closed position. The inside of the cushioning structure may have springs and/or a soft cushioning material such a foam. It could be one, two or more springs in certain example embodiments, and/or one or more pieces of foam. An example design of a spring may be conical in shape so that it may recess in to itself when fully or substantially fully compressed. A conical spring could also be set inside of a coiled spring that is a fraction (e.g., about half) the height of the conical spring. This may allow the extended deadbolt to bottom out for doors that hit the strike plate and/or frame with a greater speed and force. One could increase the tension on one or more springs. As discussed herein, foam may also be used for force absorbing material in cushioning structures in various embodiments of this invention. The cushioning structure may be telescoping in nature in example embodiments of this invention.

In certain example embodiments of this invention, there is provided a deadbolt cushioning system comprising: a deadbolt cushioning structure attached to a door frame, so that when a door with a fully extended deadbolt closes from a wide open position toward a closed position the extended deadbolt impacts the deadbolt cushioning structure, the deadbolt cushioning structure for preventing the extended deadbolt from impacting the door frame and for preventing the extended deadbolt from impacting a strike plate attached to the door frame; wherein the deadbolt cushioning structure includes a first housing and second housing with a biasing structure provided therebetween, the biasing structure comprising foam and/or a spring; wherein the first housing is affixed to a face of the door frame, wherein the second housing is slidable relative to the first housing, so that when the deadbolt impacts the deadbolt cushioning structure the biasing structure compresses and the second housing slides relative to the first structure and moves toward the face of the door frame to which the first housing is affixed.

BRIEF DESCRIPTION OF THE DRAWINGS

FIG. 2(*b*) is a perspective view of the cushioning structure of FIGS. 1(*a*)-(*b*) and 2(*a*).

FIG. 5(*b*) is an exploded perspective view of the cushioning structure of FIG. 5(*a*).

FIG. 5(*c*) is an exploded cross-sectional view of the cushioning structure of FIGS. 5(*a*)-(*b*).

FIG. 5(*d*) is a cross-sectional view of the cushioning structure of FIGS. 5(*a*)-(*c*).

FIG. 5(*e*) is a top view of the spring supporting structure of the cushioning structure of FIGS. 5(*a*)-(*d*).

FIGS. 8(*b*) and 8(*c*) are cross sectional views of the cushioning structure of FIG. 8(*a*), including foam inside the structure, as a deadbolt hits it and causes the foam to compress moving from the position of FIG. 8(*b*) to the position of FIG. 8(*c*).

FIG. 8(*d*) is an exploded perspective view of the cushioning structure of FIGS. 8(*a*)-(*c*), absent the foam.

FIG. 8(*e*) is a perspective view of the cushioning structure of FIGS. 8(*a*)-(*d*), absent the foam.

FIGS. 9(*c*) and 9(*d*) are top cross sectional view of the cushioning structure of FIGS. 9(*a*)-(*b*), illustrating that wedges/shims may be used to adjust the position/angle of the cushioning structure relative to a surface of the frame to which it is mounted.

FIG. 9(*e*) is a perspective view of the cushioning structure of FIGS. 9(*a*)-(*d*).

FIG. 9(*f*) is a front plan view of the cushioning structure of FIGS. 9(*a*)-(*e*).

FIG. 9(*g*) is a side plan view of the cushioning structure of FIGS. 9(*a*)-(*f*).

FIGS. 10(*c*) and 10(*d*) are top cross sectional view of the cushioning structure of FIGS. 10(*a*)-(*b*), illustrating that wedges/shims/spacers may be used to adjust the position/angle of the cushioning structure relative to a surface of the frame to which it is mounted.

FIG. 10(*e*) is an exploded side plan view of components of the cushioning structure of FIGS. 10(*a*)-(*d*).

FIG. 10(*f*) is a side plan view of components of the cushioning structure of FIGS. 10(*a*)-(*e*).

FIGS. 10(*g*)-(*h*) are side plan views of the cushioning structure of FIGS. 10(*a*)-(*f*) illustrating that a set screw(s) may be used to adjust an angle of the cushioning structure.

FIG. 15(*b*) is an exploded perspective view of the deadbolt cushioning structure of FIGS. 15(*a*) and 15(*c*)-(*d*), but taken from an inverted perspective compared to FIG. 15(*a*).

FIG. 15(*c*) is a perspective view of the assembled deadbolt cushioning structure of FIGS. 15(*a*)-(*b*).

FIG. 15(*d*) is a side cross-sectional view of the deadbolt cushioning structure of FIGS. 15(*a*)-(*c*).

DETAILED DESCRIPTION OF THE INVENTION

Figure 1A:
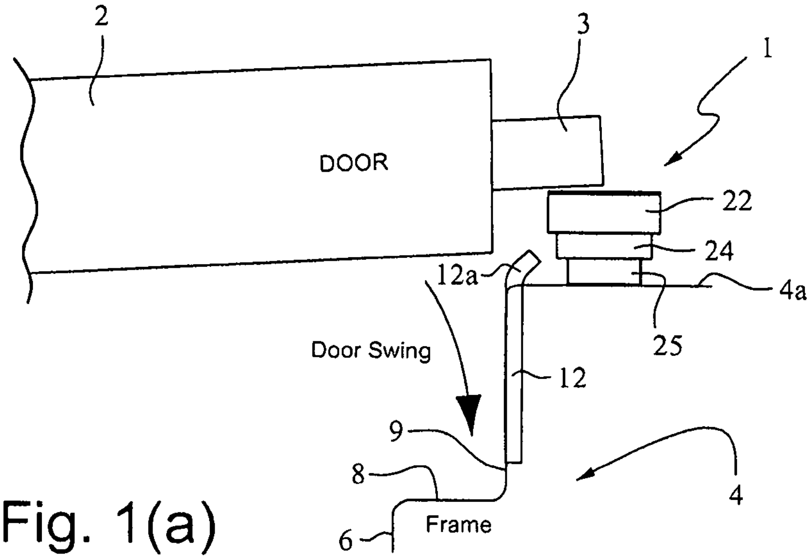
FIGS. 1(*a*) and 1(*b*) are top cross sectional view of a cushioning structure, according to an example embodiment of this invention, as a door with an extended deadbolt is being closed toward a door frame.

Referring now more particularly to the accompanying drawings in which like reference numerals indicate like parts throughout the several views. Also, different embodiments described herein may, or may not, be used together with each other for a given door structure in various embodiments of this invention.

Figure 1B:
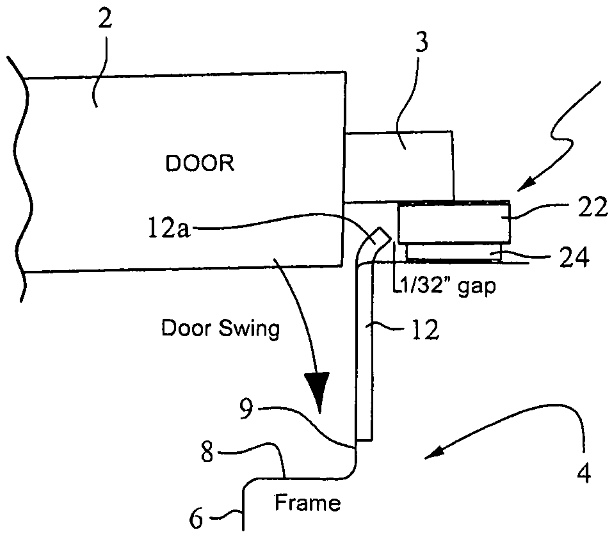

FIGS. 1(*a*) and 1(*b*) are top cross sectional view of a cushioning structure 1, according to an example embodiment of this invention, as a door 2 with a fully extended deadbolt 3 is being closed toward a door frame 4. The door frame 4 is provided for surrounding a door when a door is in a shut position. The door frame 4 may include, for example and without limitation, face 4*a*, protruding soffit 6, door stop 8, and rabbet 9. The door frame 4 may be metal, wood, or the like. The strike plate 12, often made of metal, is mounted to the frame 4, often on a rabbet 9 portion of the frame 4. Strike plate 12 includes lip 12*a* (which may be curved or straight) and also includes opening 12*b* defined therein for receiving the deadbolt 3 and opening 12*c* defined therein for receiving the retractable latch 14. FIGS. 1(*a*)-(*b*) illustrate that when the door 2 is being closed in the illustrated "door swing" direction toward the door frame 4 including toward stop 8, the extended deadbolt 3_hits the cushioning structure 1 and the force with which the deadbolt 3 impacts the cushioning structure causes the cushioning structure to compact from the FIG. 1(*a*) position into the compressed FIG. 1(*b*) position thereby dampening/cushioning the impact of the deadbolt. This allows for the deadbolt 3 impact to create less noise and less damage compared to if the cushioning structure 1 was not present and the deadbolt 3 instead impacted the face 4*a* of the door frame 4.

Figure 2A:
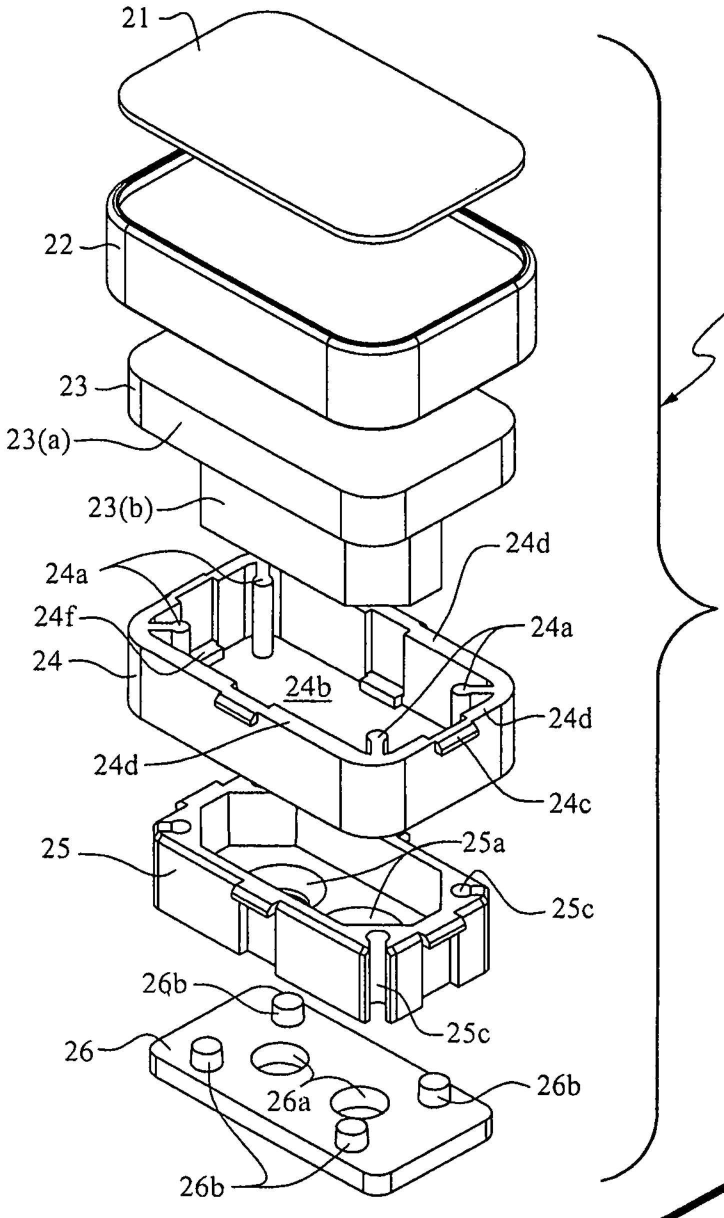
FIG. 2(*a*) is an exploded perspective view of the cushioning structure of FIGS. 1(*a*)-(*b*).
Figure 2B:
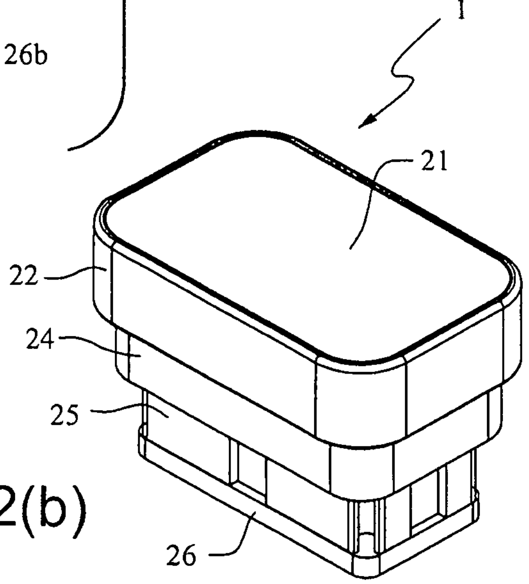
Figure 3:
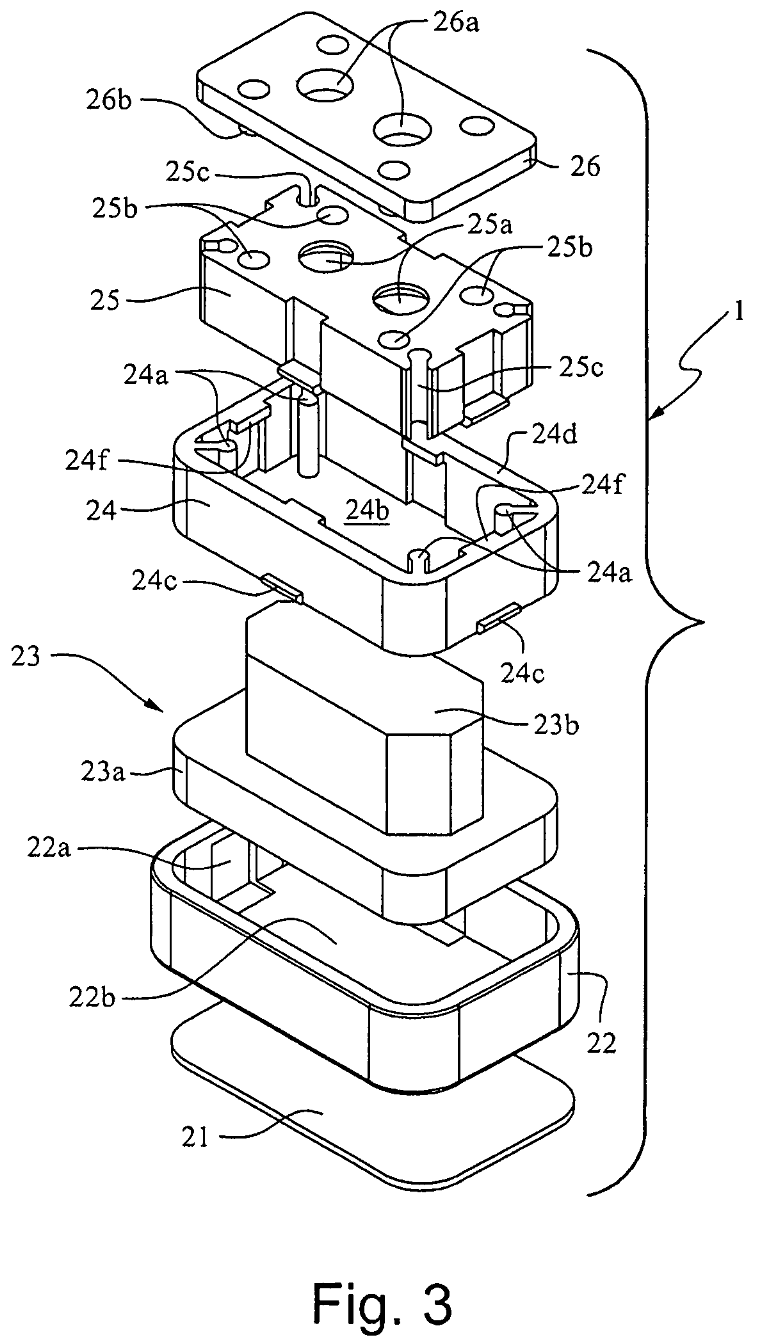
FIG. 3 is an exploded perspective view of the cushioning structure of FIGS. 1(*a*)-(*b*) and 2(*a*)-(*b*), but taken from an inverted perspective compared to FIG. 2(*a*).

FIG. 2(*a*) is an exploded perspective view of the telescoping cushioning structure 1 of FIGS. 1(*a*)-(*b*), and FIG. 2(*b*) is a perspective view of the assembled cushioning structure of FIGS. 1(*a*)-(*b*) and 2(*a*). The deadbolt cushioning structure I includes impact plate insert 21, top housing 22, foam insert 23 including a base 23*a* and a protruding section 23*b* extending from the base, the foam insert 23 for compressing upon deadbolt impact and dampening/cushioning the impact, middle housing 24 for receiving part of all of the foam insert 23, base housing 25 including holes 25*a* therein through which fasteners (e.g., screws) may extend in order to attached the cushioning structure 1 to the door frame 4, and optional riser 26 which also has holes 26*a* defined therein through which fasteners (e.g., screws) may extend in order to attached the cushioning structure 1 to the door frame 4. The insert 21 may be adhered to the top housing structure 22 using adhesive or the like. The top structure 22 and/or insert 21 may have a suitable durometer such as any of softness durometers 30, 40, 50, 60, 70 or 90, and may be dual durometer in example embodiments. The assembled cushioning structure 1 is shown in FIG. 2(*b*). And FIG. 3 is an exploded perspective view of the cushioning structure of FIGS. 1-2, but taken from an inverted perspective compared to FIG. 2(*a*). It can be seen in FIGS. 2-3 that impact plate insert 21 fits in a small recess in top structure 22 and is plate-like in shape. The base portion 23*a* of the foam insert 23 is mostly or entirely housed in a cavity of top housing structure 22, and the extending protruding section 23*b* of the foam insert is partially, mostly or entirely housed in the interior cavity 24*b* of middle housing 24. One or more springs may be used instead of, or in addition to, the foam insert 23 in the housing cavities of this embodiment (e.g., see the springs in other figures herein). A distal end portion of the protruding section 23*b* of the foam insert 23 may be housed in the interior cavity of base housing 25 over the screws and screw holes 25*a*. Male projections 26*b* extending from the base portion of riser 26 fit into female holes 25*b* in the bottom of base housing 25, thereby allowing the base housing 25 to be attached to and mounted on the riser 26. Female slots 25*c* at or proximate the exterior corners of housing 25 receive respective elongated male projections 24*a* extending from the interior corners of middle housing 24, so that the base housing 25 at least partially slides into the interior cavity 24*b* of middle housing 24 in a retractable and sliding manner. The male/female interlocking parts allowing elements 23-26 to fit together in an interlocking manner, yet be able to slide in a telescoping manner upon deadbolt impact and foam 23 compression, has been found to be highly advantageous in that large amounts of undesirable wobble of the structure can be reduced and improved dampening can be provided. Lip projections/tabs 24*c* on the exterior of middle housing 24 snap-fit into respective detents 22*a* in the interior walls of top structure 22 so that the middle housing 24 is attached to the top structure 22 with the base portion 23*a* of the foam insert 23 being located mostly or entirely inside the cavity of top structure 22 and being supported by the external peripheral portion including projections 24*a* and walls 24*d* of middle housing 24. Thus, the base portion 23*a* of the foam insert is located in the interior cavity 22*b* of top structure 22, whereas the projection portion 23*b* of the foam insert is located mostly or entirely in the interior cavity 24*b* of middle housing 24. Middle housing 24 and base housing 25 are slidingly attached to each other so that they can slide relative to each other when the deadbolt 3 impacts the structure 1 and the foam insert 23 compresses due to the deadbolt impact. FIG. 1(*a*) shows the cushioning structure 1 prior to deadbolt impact when the foam insert 23 is in its normal expanded position, and FIG. 1(*b*) shows the cushioning structure after deadbolt 3 impact when the foam insert 23 is in a compressed state and the middle housing 24 had slid down and over the exterior of base housing 25 toward the face 4*a* of frame 4. The middle housing 24 may slide, in an interlocking manner, all the over the base housing 25 and contact the frame 4, or may slide only part-way over (e.g., at least over half) the base housing 25 upon full or substantially full compression of the foam insert in different embodiments of this invention. Base housing 25 is stationary and rigidly affixed to the door frame 4 via screws, and housings 22 and 24 upon deadbolt 3 impact slide down and over the base housing 25 as shown in the figures. In certain embodiments, the amount that foam 23 can compress upon deadbolt impact is limited by one or more of: (a) the foam 23 reaching the bottom of base housing 25(*b*) the projections 24*f* on the interior of housing 24 reaching and impacting riser 26, and/or (c) the impacting of face 4*a* of the frame 4 by the middle housing 24 when it slides over base housing 25 toward the frame upon deadbolt impact. This is how the cushioning structure dampens/cushions the impact of the deadbolt 3 and reduces noise and/or damage due to the same. The telescoping design of the cushioning structure 1 shown in FIGS. 1-3 allows for a longer distance between the expanded and compressed positions, thus allowing for a large amount of foam compression and thus dampening/cushioning of deadbolt impacts. It is noted that the housing parts may be formed of molded plastic or any other suitable material (e.g., polypropylene or ABS) in example embodiments of this invention.

Surprisingly, it has been found that several structures reduced wobble to a desirable level in the cushioning structure. In particular, it was found that providing four detents 22*a* on the respective four interior walls of the top housing 22, for mating engagement with four respective tabs/projections 24*c* on the four exterior walls of housing 24, advantageously reduced wobble of the structure 1 but allowed enough wobble near the top of the structure to account for normal tolerance variances. Additionally, it was found that the provision of the projections 26*b* on riser for mating engagement with holes 25*a* reduced wobble near the bottom of the cushioning structure in an advantageous manner. These wobble improvements represent significant improvements from a technical perspective, while allowing for a small amount of wobble near the top of the structure to account for tolerance variances. Additionally, the four detents 22*a* on the four inside walls of top housing 22 may allow for the top housing 22 to be removed if desired (e.g., to replace the foam insert, or to access the screws for removal of the structure from a door frame).

The FIG. 15(*a*)-(*d*) embodiment is the same as the FIG. 1-3 embodiment, except for the design of metal insert 21/21' and top housing 22/22'. Thus, all discussions herein regarding the FIG. 1-3 embodiment also apply to the FIG. 15(*a*)-(*d*) embodiment, and vice versa. FIG. 15(*a*) is an exploded perspective view of a deadbolt cushioning structure 1 according to this embodiment; FIG. 15(*b*) is an exploded perspective view of the deadbolt cushioning structure 1 of FIGS. 15(*a*) and 15(*c*)-(*d*), but taken from an inverted perspective compared to FIG. 15(*a*); FIG. 15(*c*) is a perspective view of the assembled deadbolt cushioning structure 1 of FIGS. 15(*a*)-(*b*); and FIG. 15(*d*) is a side cross-sectional view of the deadbolt cushioning structure 1 of FIGS. 15(*a*)-(*c*). In the FIG. 1-3 embodiment, the metal insert plate 21 is flat and continuously provided across the upper surface of top housing 22. However, in the FIG. 15(*a*)-(*d*) embodiment, the metal insert plate 21' with an architectural finish has an aperture 21 a defined therein that receives a projection 22*c* of the top housing 22' that protrudes upwardly from the major upper surface 22*d* of the top housing 22'. As perhaps best shown in FIG. 15(*d*), the projection 22*c* extending through aperture 21*a* provides for a raised surface of the cushioning structure 1 in an area where the deadbolt 3 is designed to hit the structure 1. The raised surface of projection 22*c* may be a distance "d" (e.g., from about 0.05 to 0.40 inches) above the upper surface of metal insert 21'. The raised upper surface of the projection 22*c* may also be above the upper peripheral lip 22*e* of the housing 22 as shown in FIG. 15(*d*), although in other example instances it may be even with or below the lip 22*e*. It has been found that this raised generally flat area provided by projection 22*c* extending through aperture 21*a* may better receive impacts from the deadbolt 3 and reduces potential damages to the structure 1.

Figure 16:
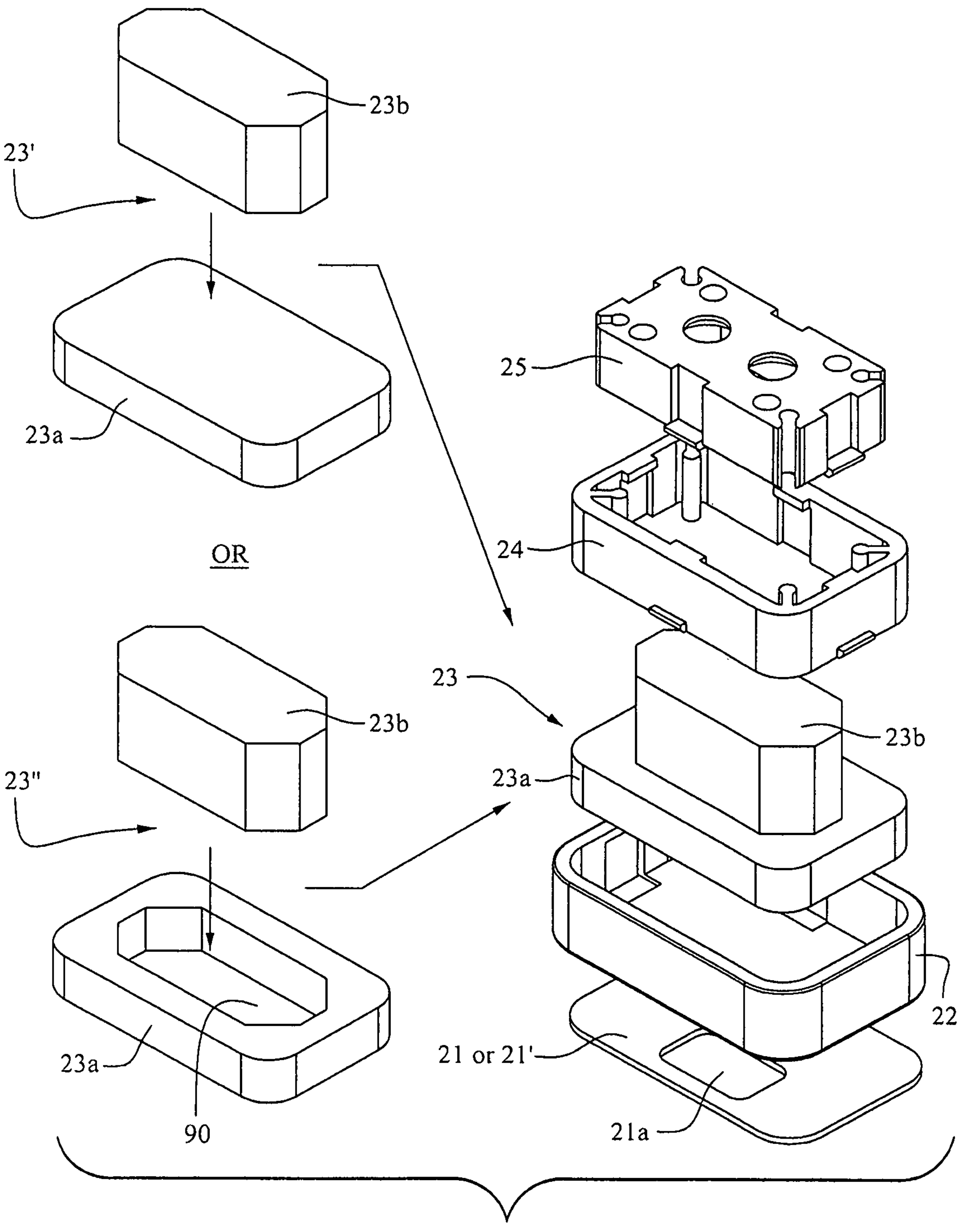
FIG. 16 is an exploded perspective view of at least part of a deadbolt cushioning structure according to any of the FIG. 1-4 or 15(*a*)-(*d*) embodiments.

FIG. 16 illustrates that the foam insert 23 in any of the FIG. 1-4 or 15(*a*)-(*d*) embodiments can be made in different ways in different example embodiments of this invention. First, it is possible for the foam insert 23 to be of one-piece construction so that the entire insert including portions 23*a* and 23*b* is made of one piece of foam. Second, as shown at 23' in FIG. 16, a two-piece construction of the foam insert 23 is possible where the base portion 23*a* is plate-like in shape so as to be provided continuously or substantially continuously across substantially the entirety or across the entirety of the inside cavity of top housing 22, and for protruding section 23*b* of the foam insert 23 to be located on and supported by the base portion 23*a*. Third, as shown at 23" in FIG. 16, a two-piece construction of the foam insert 23 is possible where the base portion 23*a* is donut yet plate-like in shape so as to have an aperture 90 defined in a central portion thereof, and for protruding section 23*b* of the foam insert 23 to be located in and extend partway or all the way through aperture 90.

In certain example embodiments of this invention (see all embodiments in FIG. 16; as well as all embodiments of FIGS. 1-3 and 15), the base portion 23*a* of the foam insert is made of soft density foam and the protruding section 23*b* of the foam insert is made of medium density foam. Thus, the protruding section 23*b* of the foam insert is made of higher density foam than is the base portion 23*a*. It has surprisingly been found that this allows for the structure 1 to realized improved shock absorbing characteristics and improved noise reduction upon deadbolt impacts. The soft density foam of the base portion 23*a* has more give and more compression upon deadbolt impact than does the medium density foam of the protruding section 23*b* of the foam insert. It has been found that having the soft density foam of base 23*a* compress first upon deadbolt impact, followed by compression of the higher density foam of section 23*b*, results in improved noise dampening and better shock absorbing characteristics. Thus, this is a significant technical advantage associated with such embodiments.

Figure 4A:
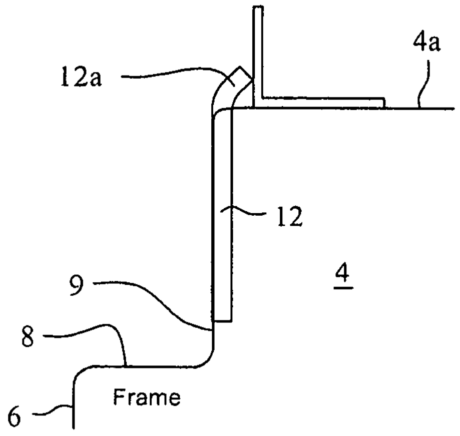
FIGS. 4(*a*)-4(*c*) are top views illustrating an example of how a strike plate may be used to help align/locate attachment screws for attaching the cushioning structure to a door frame.
Figure 4B:
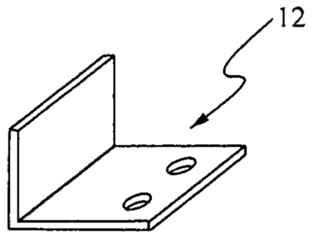
Figure 4C:
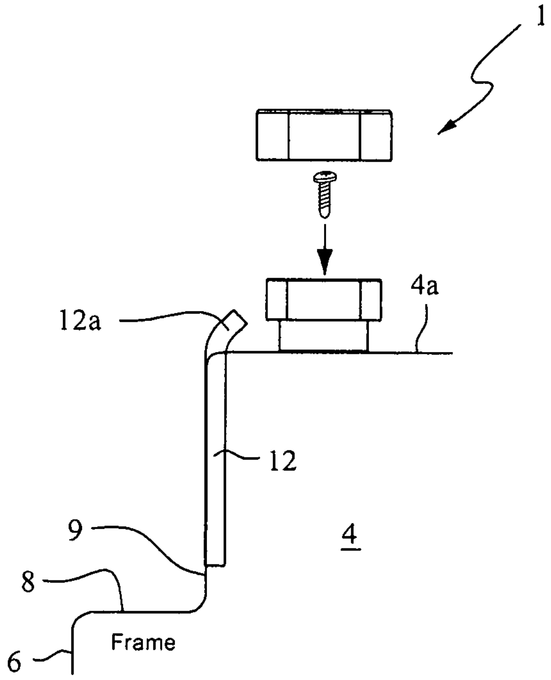
Figure 5A:
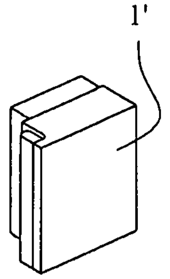
FIG. 5(*a*) is a perspective view of a cushioning structure according to another example embodiment of this invention.
Figure 5B:
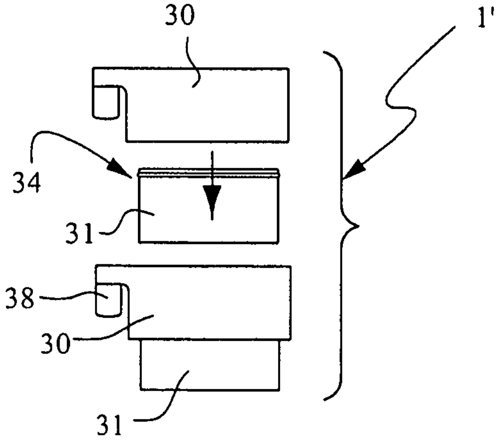
Figure 5C:
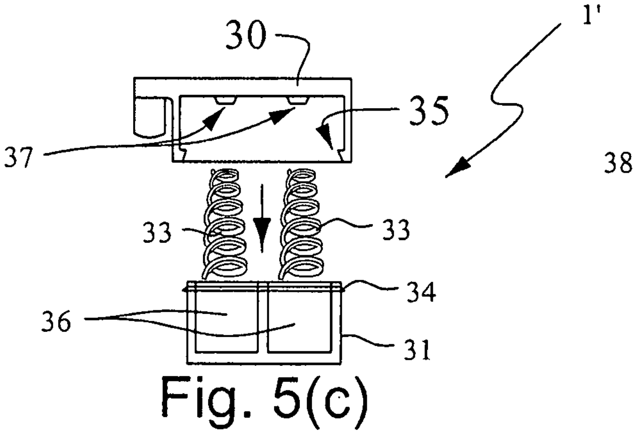
Figure 5D:
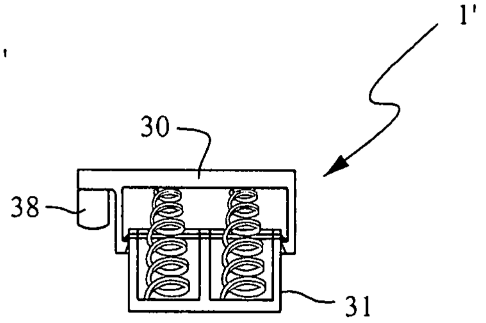
Figure 5E:
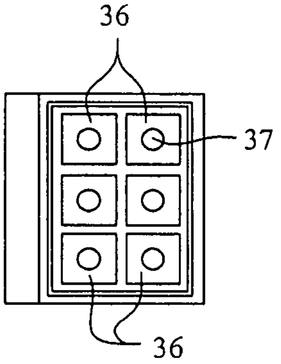
Figure 6A:
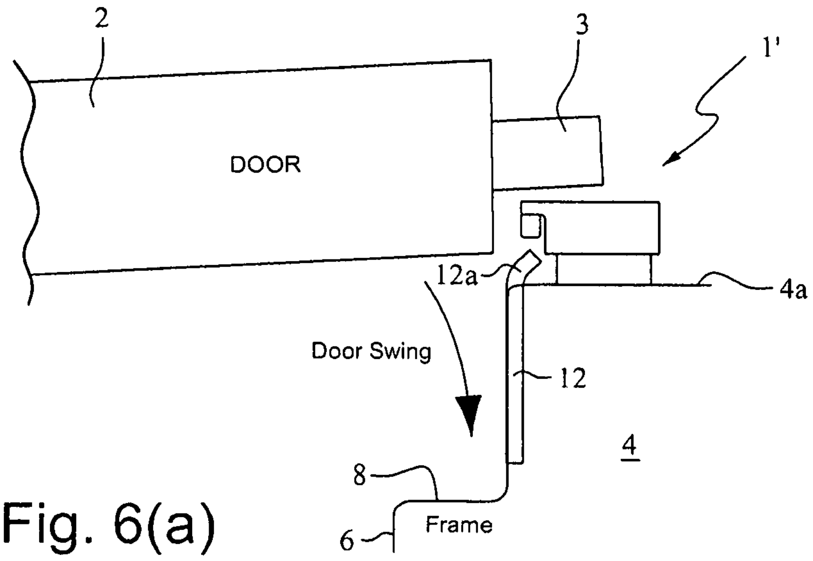
FIGS. 6(*a*) and 6(*b*) are top cross sectional view of the cushioning structure of FIGS. 5(*a*)-(*e*) as a door with an extended deadbolt is being closed toward a door frame.
Figure 6B:
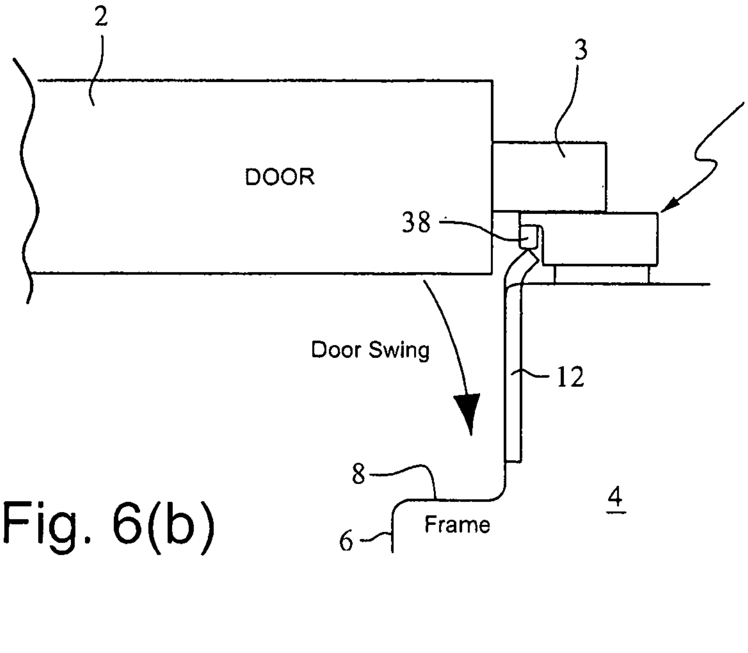
Figure 7:
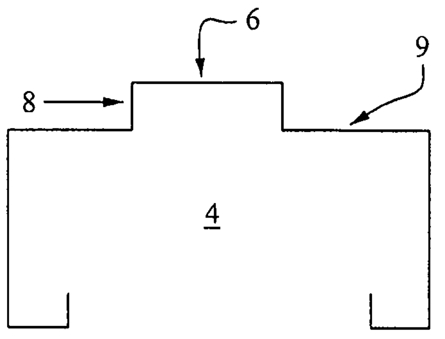
FIG. 7 is a top cross sectional view of a door frame.
Figure 8A:
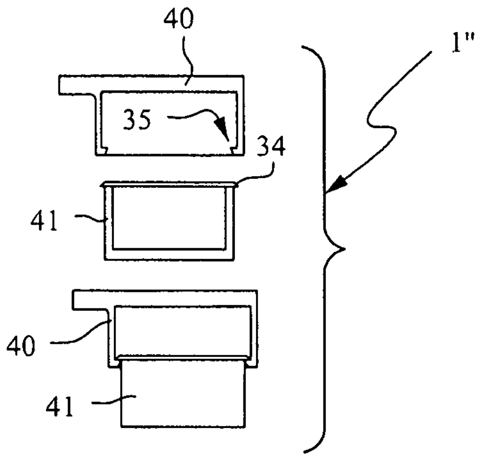
FIG. 8(*a*) is an exploded side cross sectional view of a cushioning structure according to another example embodiment of this invention, which may be used to cushion deadbolts as shown in FIG. 1 or FIG. 6.
Figure 8B:
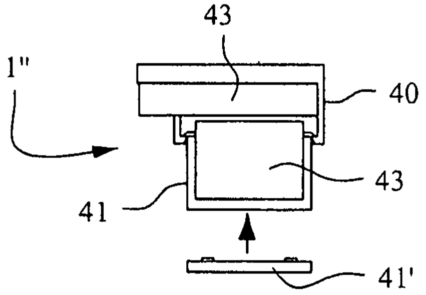
Figure 8C:
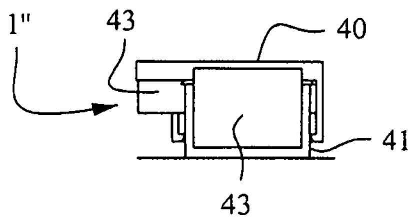
Figure 8D:
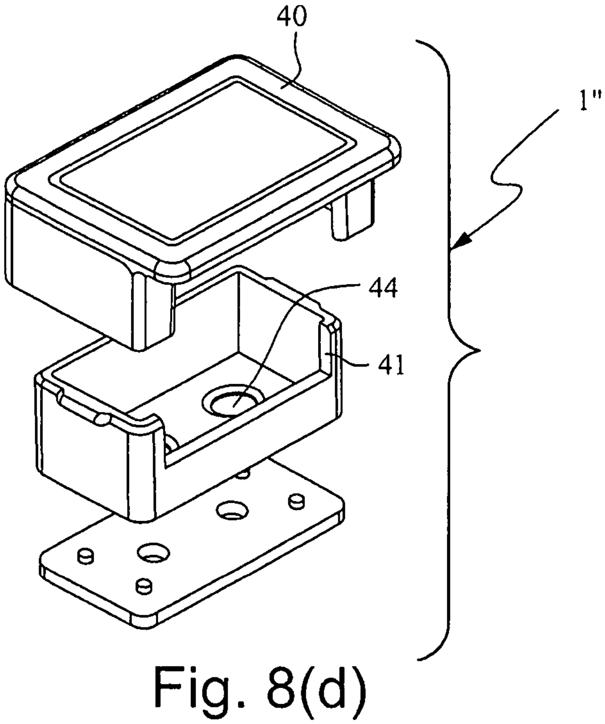
Figure 8E:
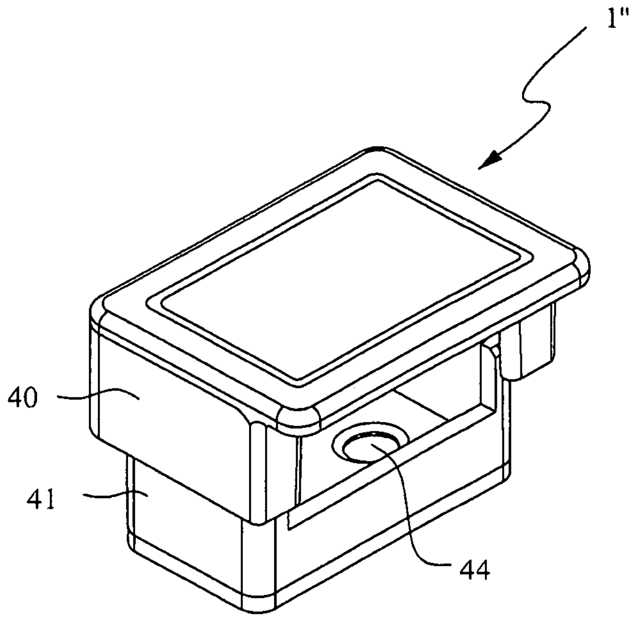
Figure 9A:
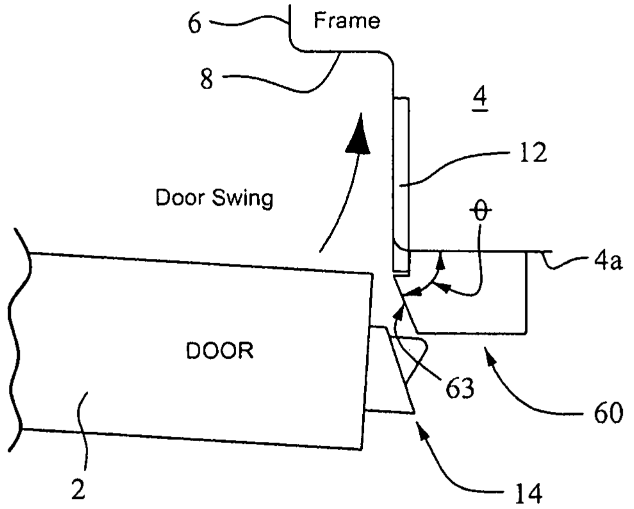
FIGS. 9(*a*) and 9(*b*) are top cross sectional view of a cushioning structure, according to another example embodiment of this invention, as a door with a retractable latch is being closed toward a door frame.
Figure 9B:
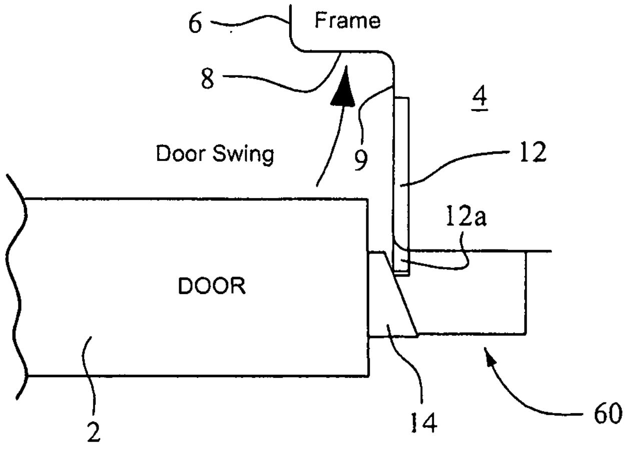
Figure 9C:
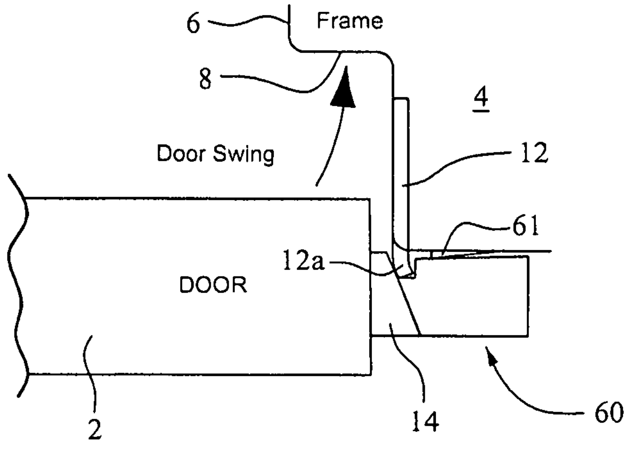
Figure 9D:
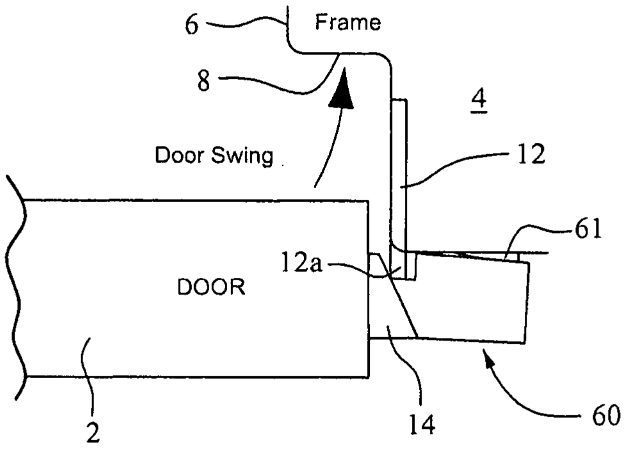
Figure 9E:
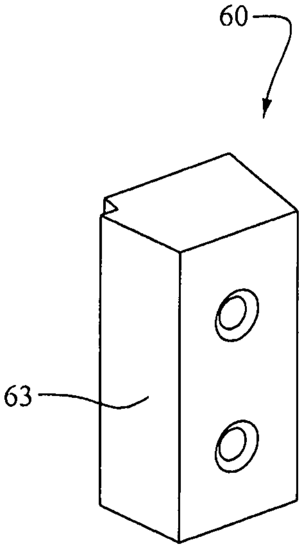
Figure 9F:
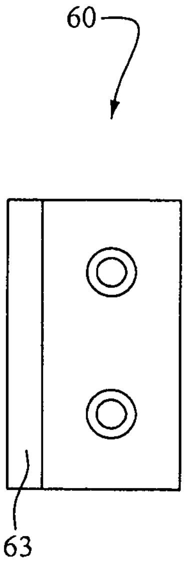
Figure 9G:
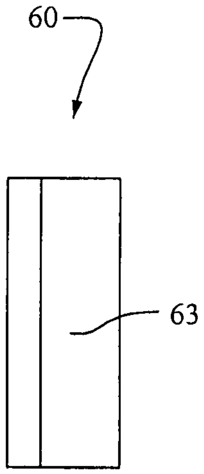
Figure 10A:
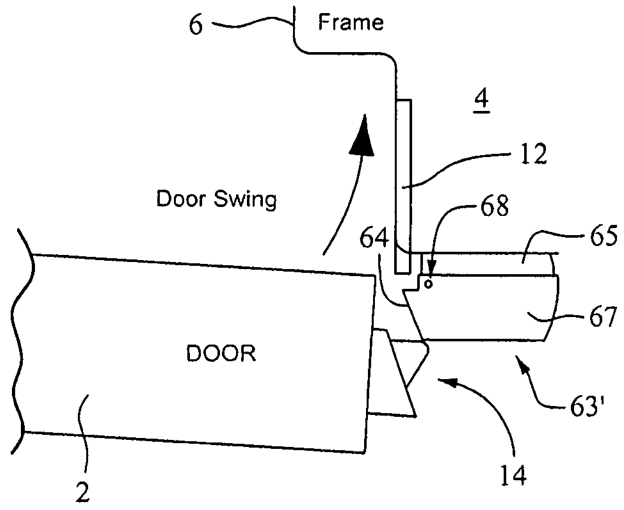
FIGS. 10(*a*) and 10(*b*) are top cross sectional view of a cushioning structure, according to another example embodiment of this invention, as a door with a retractable latch is being closed toward a door frame.
Figure 10B:
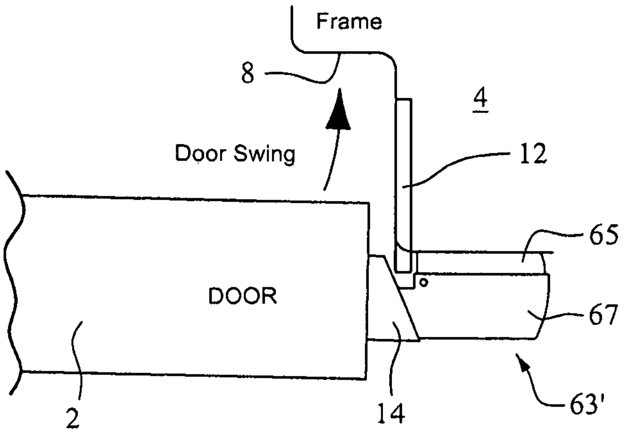
Figure 10C:
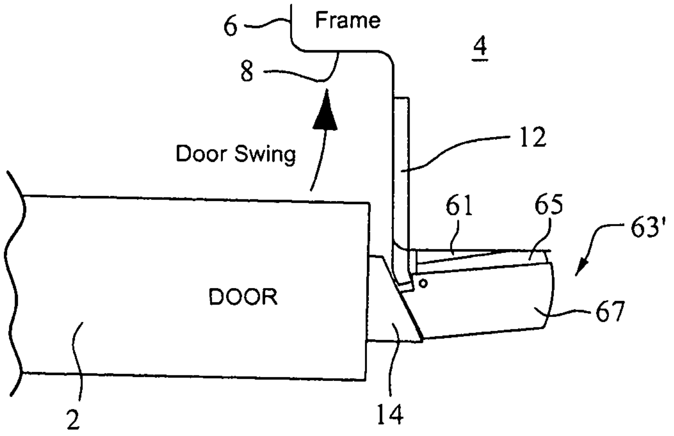
Figure 10D:
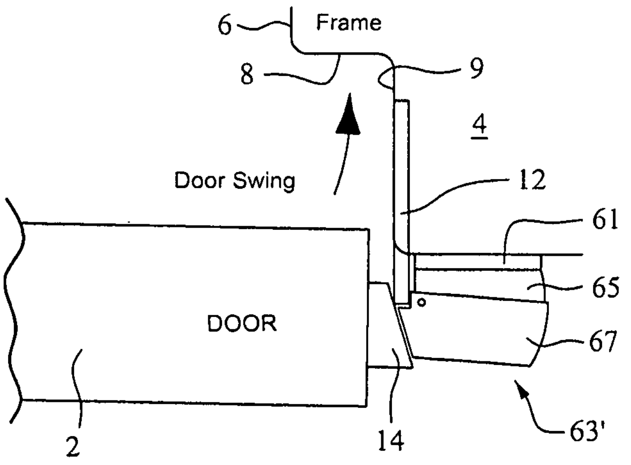
Figure 10E:
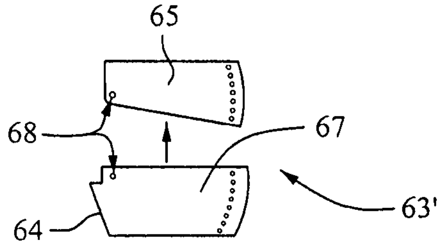
Figure 10F:
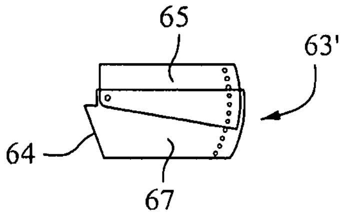
Figure 10G:
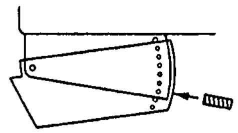
Figure 10H:
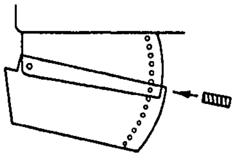

FIGS. 4(*a*)-4(*c*) are top views illustrating an example of how a strike plate may be used to help align/locate attachment screws for attaching the cushioning structure 1 of FIGS. 1-3 (or any other embodiment herein) to a door frame 4. Note that the strike plate illustrated in FIG. 4(*b*) does not have the apertures shown therein, for purposes of simplicity. The screw holes 25*a*, 26*a* in the cushioning structure 1 may be spaced apart the same distance as the screw holes in the strike plate 12. The strike plate 12 is placed on the face 4*a* of the frame 4 so as to contact a strike plate 12 affixed to the frame 4, and a user marks through the screw holes in the strike plate onto the face 4*a* where the screws for attaching the structure 1 are to be positioned (see FIG. 4(*a*)). The strike plate 12 is then removed, and the cushioning structure 1 is placed on the face 4*a* of the frame 4 so that the screw holes 25*a* ; 26*a* in the cushioning structure 1 are aligned with the marks on the face 4*a*, and then screws are inserted through the holes 25*a*, 26*a* into the frame 4 to attach the structure 1 to the frame 4 (see FIG. 4(*c*)). Thus, the strike plate may be used as a guide and for example a 1/32 inch clearance (width of the strike plate) may be used as clearance to prevent the depression of the structure 1 from hitting an attached strike plate 12 that is affixed to the frame. FIG. 5(*a*) is a perspective view of a cushioning structure 1' according to another example embodiment of this invention, and FIG. 5(*b*) is an exploded perspective view of the cushioning structure of FIG. 5(*a*). The cushioning structure 1' may be used the same way as structure 1 discussed above. However, the structure 1' of FIGS. 5(*a*)-(*b*) has only two housings 30, 31 instead of the three in the structure 1 discussed above. In the FIG. 5 embodiment, cushioning springs 33 are provided inside the housings 30, 31 so that the housings 30, 31 can move relative to each other upon deadbolt impact. A lip(s) 34 on housing 31 engages detent(s) 35 of housing 30 so that housings 30 and 31 can be snap-fit to each other. FIG. 5(*c*) is an exploded cross-sectional view of the cushioning structure of FIGS. 5(*a*)-(*b*), and FIG. 5(*d*) is a cross-sectional view of the cushioning structure of FIGS. 5(*a*)-(*c*). Springs 33 are provided in respective cavities or channels 36 defined in housing and are aligned with and fit over projections 37 of housing 30 in order to hold the springs in place in the structure 1'. While six springs, and corresponding cavities/channels/recesses 36 are shown in FIGS. 5(*a*)-(*e*), other numbers may instead be used. Tension of springs could vary to accommodate variances in door closing speeds and weight of doors. Screw holes could alternatively be used to attach the springs in place in the housings. FIGS. 6(*a*) and 6(*b*) are top cross sectional view of the cushioning structure 1' of FIGS. 5(*a*)-(*e*) as a door with an extended deadbolt 3 is being closed toward door frame 4. Similar to the FIG. 1-4 embodiment, FIG. 5-6 illustrate that when the door 2 is being closed in the illustrated "door swing" direction toward the door frame 4 including toward stop 8, the extended deadbolt 3 hits the cushioning structure 1' and the force with which the deadbolt 3 impacts the cushioning structure 1' causes the cushioning structure to compact due to compression of the springs 33 from the FIG. 6(*a*) position into the compressed FIG. 6(*b*) position thereby dampening/cushioning the impact of the deadbolt. This allows for the deadbolt 3 impact to create less noise and less damage compared to if the cushioning structure 1' was not present and the deadbolt 3 instead impacted the face 4*a* of the door frame 4. Like the FIG. 1-4 embodiment, the FIG. 5-6 embodiment is a telescoping structure so that when the springs 33 compress and/or depress the housings 30, 31 slide relative to one another as shown in the figures. Rubber cushion 38 may be provided on an extension portion of housing 30 and be adapted to hit the strike plate 12 upon spring compression to prevent damage to the cushioning structure 1' and limit the compression of the structure 1' (a similar cushion 38 may be used in the FIG. 1-4 embodiment and/or the FIG. 8 embodiment). Holes may be provided in the bottom of housing 31 to allow air to escape upon compression of the cushioning structure 1' as the housing 30 slides down and over stationary housing 31; and/or to allow screws to attach the structure 1' to the frame 4. FIG. 7 is a top cross sectional view of a door frame 4, provided for purposes of understanding as to door frame structure. As discussed above, a door frame 4 may include, for example and without limitation, face 4*a*, protruding soffit 6, door stop 8, and rabbet 9. The door frame 4 may be metal, wood, or the like, and may be hollow or solid in different instances. FIG. 8(*a*) is an exploded side cross sectional view of a cushioning structure 1" according to another example embodiment of this invention, which may be used to cushion deadbolt 3 impacts as shown in FIG. 1 or FIG. 6. FIGS. 8(*b*) and 8(*c*) are cross sectional views of the cushioning. structure 1" of FIG. 8(*a*), including foam 43 inside the structure. As a deadbolt 3 hits it, the impact causes the foam 43 (one, two or more pieces of foam) to compress and one housing to slide relative to the other so as to dampen the deadbolt strike moving from the position of FIG. 8(*b*) to the position of FIG. 8(*c*). FIG. 8(*d*) is an exploded perspective view of the cushioning structure 1" of FIGS. 8(*a*)-(*c*), absent the foam, and FIG. 8(*e*) is a perspective view of the cushioning structure 1" of FIGS. 8(*a*)-(*d*), absent the foam 43. Similar to the FIG. 1-6 embodiments, when the door 2 is being closed in the "door swing" direction toward the door frame 4 including toward stop 8, the extended deadbolt 3 hits the cushioning structure 1" and the force with which the deadbolt 3 impacts the cushioning structure 1" causes the cushioning structure 1" to compact due to compression of the foam 43 thereby dampening/cushioning the impact of the deadbolt. This allows for the deadbolt 3 impact to create less noise and less damage compared to if the cushioning structure 1" was not present and the deadbolt 3 instead impacted the face 4*a* of the door frame 4. Like the FIG. 1-6 embodiments, the FIG. 8 embodiment is a telescoping structure so that when the foam 43 compresses/depresses the housings 40, 41 slide relative to one another as shown in the figures. Holes 44 may be provided in the bottom of housing 41 to allow air to escape upon compression of the cushioning structure 1' as the housing 40 slides down and over stationary housing 41 and/or to allow screws to attach the structure 1" to the frame 4. Note also that riser 41' may optionally be provided. If a top portion of the cushioning structure (1, 1' and/or 1") extends beyond the lip 12*a* of the strike plate 12 in example embodiments, when the deadbolt 3 of the closing door impacts the cushioning structure the compression will want to bottom out on the top of the strike plate 12. In certain example embodiments of this invention (see cushioning structures 1, 1' and 1" above), the furthest down toward the frame 4 and frame face 4*a* the outermost face (the strike face) of the cushioning structure 1, 1', 1" can compress is still at a location above the upper lip 12*a* of the strike plate, in order to reduce possible damage (e.g., see FIGS. 1(*b*) and 6(*b*)). An interesting relationship is the top and base housings. A tight fit can cause air to compress. If the fit is tight, a relief hole(s) at the bottom may be provides to allow air to escape during spring and/or foam compression, as discussed above. Springs may compress independently, in combination, or be embedded between variations in the durometer of a foam pad, or a combination of some or all of these concepts.

Some may want to affix the base housing (25, 25/26, 31, 41) to the frame 4 with shallow head screws. Holes in the base housing (and optionally in an optional riser) can be provided for attachment to the frame, and/or a self-adhesive tape can be used to adhere the base housing to the frame. The screws could be thin head pan head and centered under the foam and/or conical or compression springs. It is desirable for the top of the part (e.g., housing portions 22, 24, 30, 40) to be removable so that an installer can directly fix the base housing to the face 4*a* of the door frame.

The latch of a lockset engages the strike plate on a frame just prior to latching. The latch may have a bevel so that it can more easily engage with the strike plate and allow easier closing and reducing friction. Most strike plates on a frame have a curved lip to allow the latch to begin recessing as it moves toward the hole in the strike plate on the frame. Not all bevels on latches are the same and not all angles on strike plates have the same angles or lip height. Some additional considerations that affect the normal ease of latching are variations in the angles in the setting of a frame, causing the frame to be twisted in or out and the gap between the door and frame can vary from tight to loose. This in turn can affect the angle at which the latch meets the straight or curved lip. The desired angulation of the latch and the lip of the strike plate by the manufacturer can be adversely affected by manufacturing and field installation tolerances and thus negatively impact the ease of latching.

Life safety codes and NFPA fire inspection criteria for building inspectors and fire marshals may state fire doors that should be self-closing and self-latching. Also, field modifications such as filing of a strike plate to relieve binding interference between a lock latch and the strike plate may be a code violation. For example, certain codes may state that from a seventy degrees (ADA) open position a door should not be faster than three seconds (NFPA 101) to move to with three inches from the latch, and (NFPA 80) not slower than ten seconds. In light of this, installers are prone to simply increase closing speeds to achieve a latched and/or locked condition. This adds to the increased noise. A method would be desirable to facilitate undesirable tolerance conditions that reduce the capability of a door to self-close and self-latch. In this respect, discussed below are latch cushioning structures (e.g., 60, 63') that allow the spring-biased latch 14 to easily retract prior to engaging the strike plate so that the latch has little or no interference from the initial impact of the latch hitting a strike plate, which in turn reduces or eliminates initial impact noise of a latch hitting a strike plate. Thus, the latch 14 can be completely or substantially completely withdrawn before impact with a strike plate.

FIGS. 9(*a*) and 9(*b*) are top cross sectional view of a cushioning structure 60, according to another example embodiment of this invention, as a door 2 with a retractable spring biased latch 14 is being closed toward a door frame 4 and toward stop 8. FIGS. 9(*c*) and 9(*d*) are top cross sectional view of the cushioning structure 60 of FIGS. 9(*a*)-(*b*), illustrating that optional wedges/shims 61 may be used to adjust the position/angle of the cushioning structure 60 relative to a surface 4*a* of the frame 4 to which it is mounted. FIG. 9(*e*) is a perspective view of the cushioning structure 60 of FIGS. 9(*a*)-(*d*), and FIG. 9(*f*) is a front plan view of the cushioning structure 60 of FIGS. 9(*a*)-(*e*). FIG. 9(*g*) is a side plan view of the cushioning structure 60 of FIGS. 9(*a*)-(*f*). As shown in FIG. 9, a notch or indent is provided in the cushioning structure 60, so that the engaging surface 63 is angled θ (e.g., from about 60 to 85 degrees, more preferably from about 65 to 80 degrees) relative to the face 4*a* of the frame on which the structure 60 is mounted, and so that the engaging surface 63 covers or substantially covers the lip 12*a* of the strike plate so that the latch hits the surface 63 instead of the distal end of the strike plate lip. This allows the latch to slide easily across surface 63 to reduce noise and/or potential damage to the frame and/or strike plate. When the door is closing, after the door and/or latch pass the surface 63, the spring-biased latch 14 will end up extending into the hole 12*c* in the strike plate to maintain the door 2 in a closed position.

FIGS. 10(*a*) and 10(*b*) are top cross sectional view of a cushioning structure 63', according to another example embodiment of this invention, as a door with a retractable latch is being closed toward a door frame. Cushioning structure 63' may be used in a similar manner as shown in FIG. 9 as discussed above. FIGS. 10(*c*) and 10(*d*) are top cross sectional view of the cushioning structure 63' of FIGS. 10(*a*)-(*b*), illustrating that wedges/shims/spacers 61 may be used to adjust the position/angle of the cushioning. structure 63' and latch engaging surface 64 thereof, relative to a surface/face 4*a* of the frame to which it is mounted. Latch engaging surface 64 in FIG. 10 is the same as the latch engaging surface 63 in FIG. 9, and the angle θ discussed above applies to both. Housings 65 and 67 are pivotally attached to each other via a pin in hole 68 that extends through both housings. A series of holes are then provided in the other side of both housings 65, 67, and a pin, set screw 70 or the like can be used to fit through lined up such holes in both housings in order to affix the housings 65, 67 to each other and align the angle of latch engaging surface 64 as desired. Thus, the angle of surface 64 is adjustable in such a manner, depending upon the angles of the door frame 4, strike plate, and latch assembly in a particular structure or system. As discussed herein, different locksets may have different angles of the. latch 14 compared to others, so the adjustable feature is desirable so as to fit the cushioning structure 63' to a variety of different locksets. A spacer or shim 61, as shown in FIGS. 10(*c*) and 10(*d*) may be used to adjust the height and/or angle of the engaging surface 64, to accommodate different sized strike plates, frames, and/or latch assemblies.

Figure 11A:
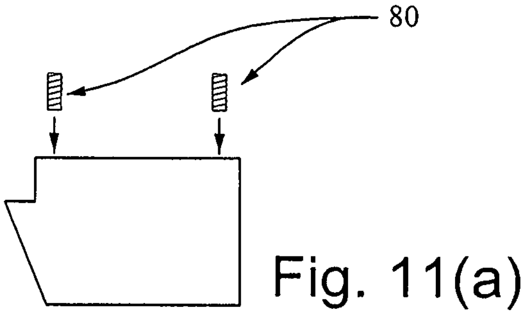
FIGS. 11(*a*)-(*c*) are side plan views, illustrating that set screws may be used to adjust the orientation angle of the cushioning structures of any of FIGS. 1-10.
Figure 11B:
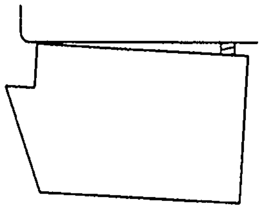
Figure 11C:
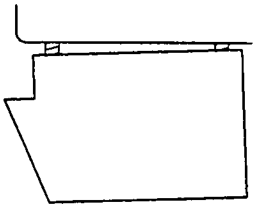
Figure 13A:
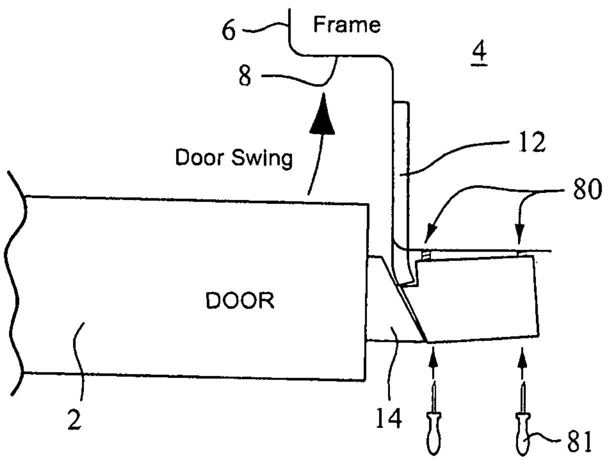
FIGS. 13(*a*)-(*b*) are top cross sectional views illustrating that set screws, adjustable via screw driver from an exposed surface of the structure, may be used to adjust the orientation angle of the cushioning structures of any of FIGS. 1-12.
Figure 13B:
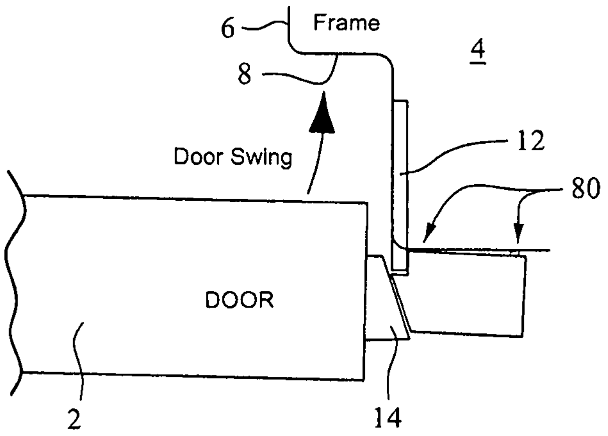

FIGS. 11(*a*)-(*c*) are side plan views illustrating that, instead of or in addition to shims and/or spacers, set screws 80 may be used to adjust the orientation angle of the cushioning structures of any of FIGS. 1-10. In this respect, FIGS. 13(*a*)-(*b*) are top cross sectional views illustrating that the set screws 80, are adjustable via screw driver 81 from an exposed surface of the structure.

Figure 12A:
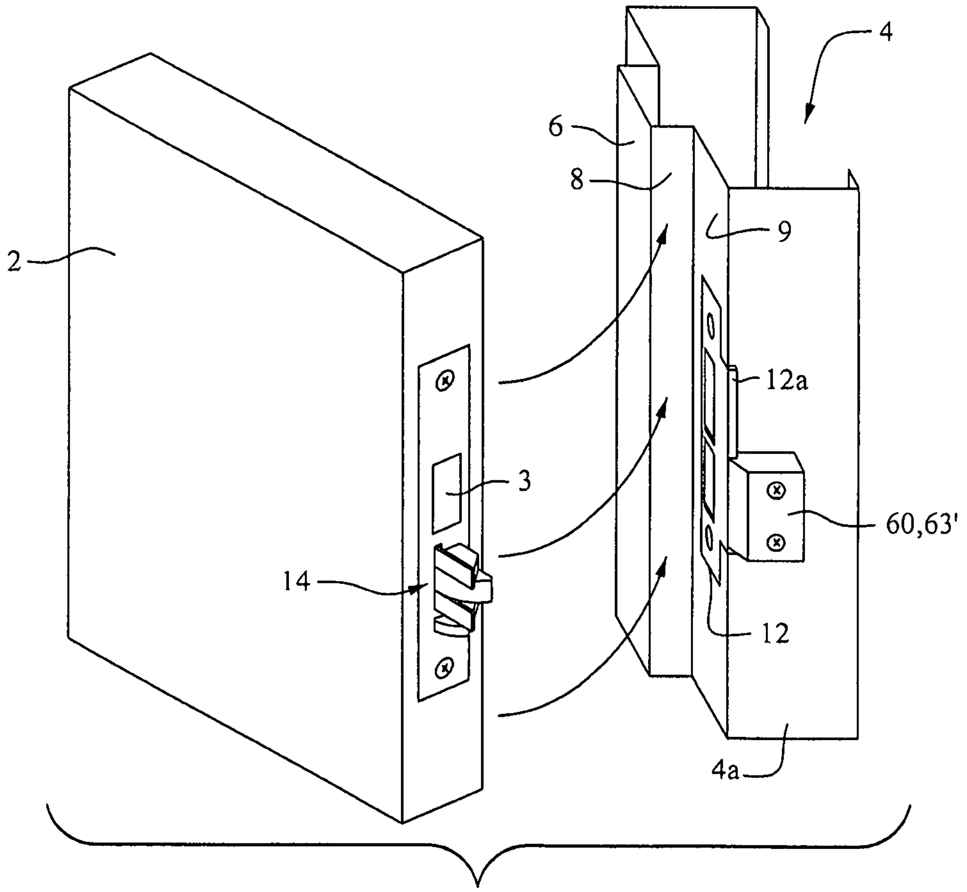
FIGS. 12(*a*)-(*b*) are perspective views illustrating where on a door frame the cushioning structures of any of FIGS. 9-11 may be located for engagement with a retractable latch of the door.
Figure 12B:
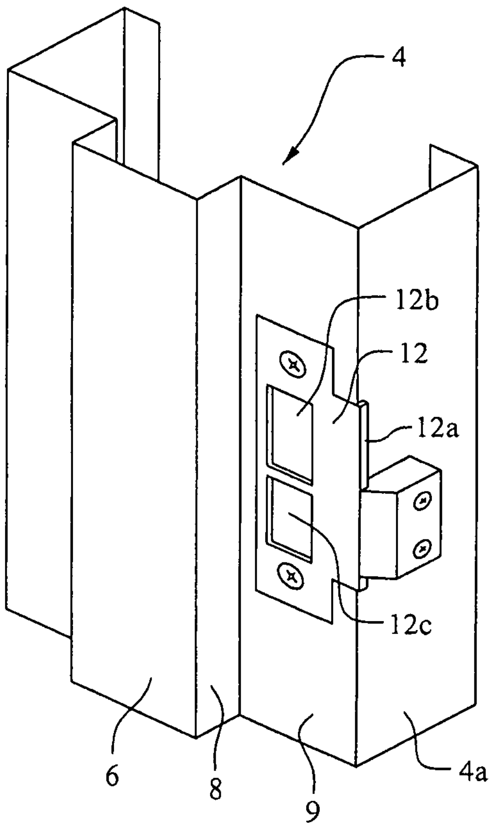

FIGS. 12(*a*)-(*b*) are perspective views illustrating where on a door frame 4 the cushioning structures 60, 63' of any of FIGS. 9-11 may be located for engagement with a retractable latch of the door.

Figure 14A:
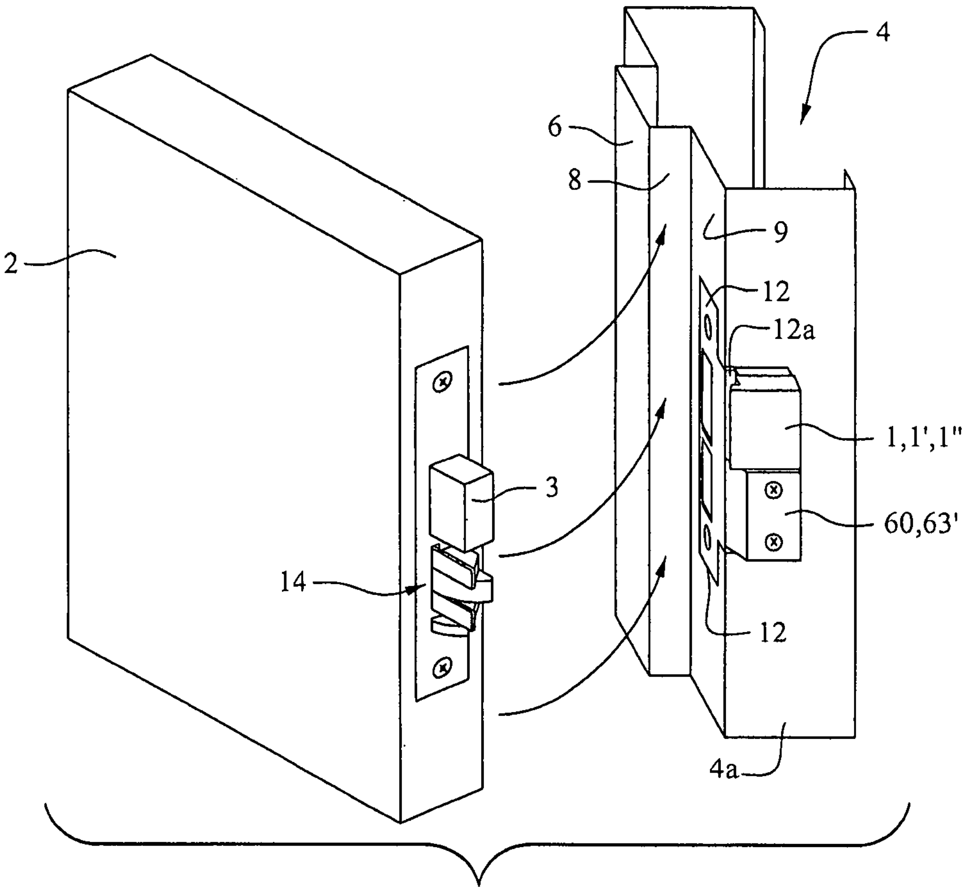
FIGS. 14(*a*)-(*b*) are perspective views illustrating that the deadbolt cushioning structure of any of FIGS. 1-8 may be used on a door frame in combination with a latch cushioning structure of any of FIGS. 9-13 in example embodiments of this invention.
Figure 14B:
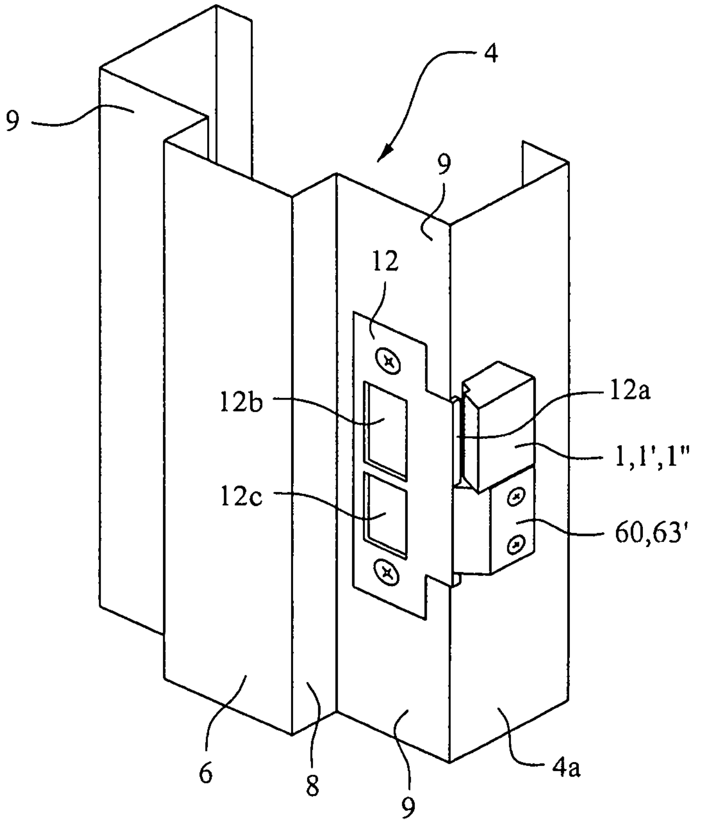
Figure 15A:
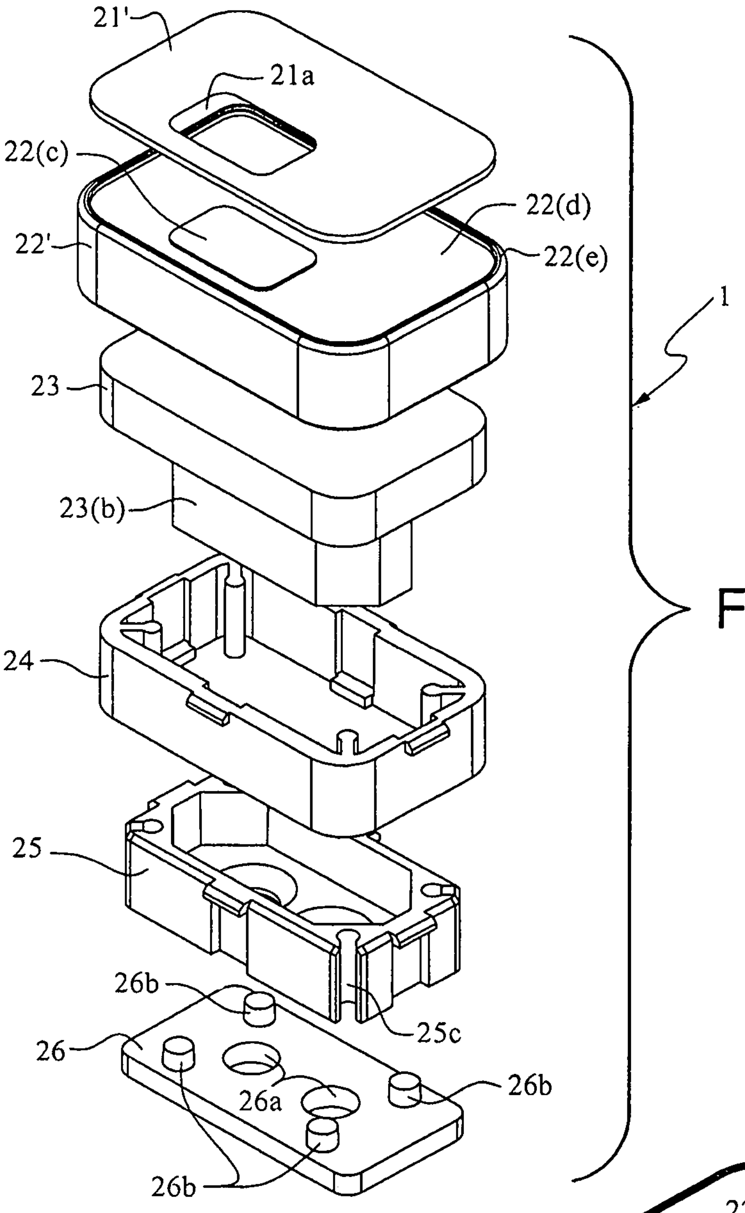
FIG. 15(*a*) is an exploded perspective view of a deadbolt cushioning structure 1 according to another example embodiment of this invention (similar to the FIG. 1-3 embodiment).
Figure 15C:
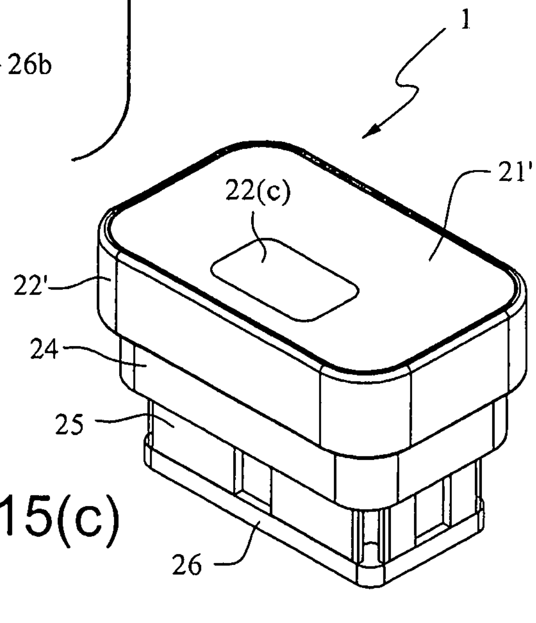
Figure 15B:
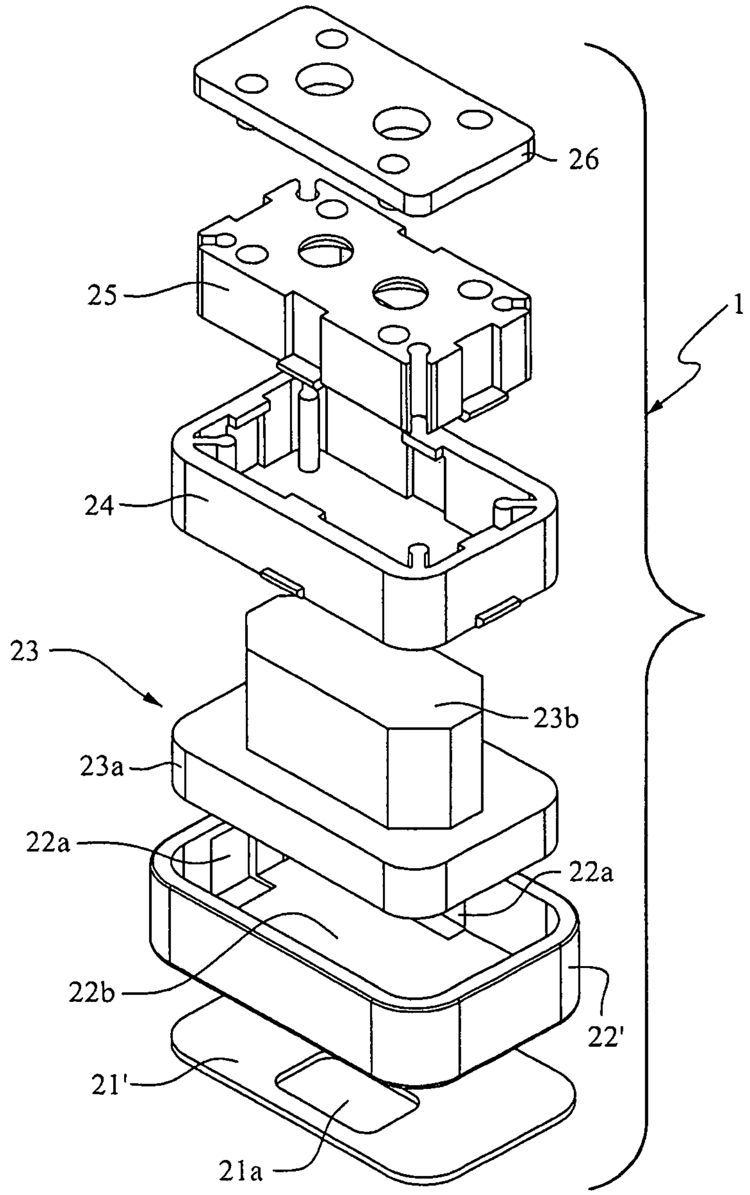
Figure 15D:
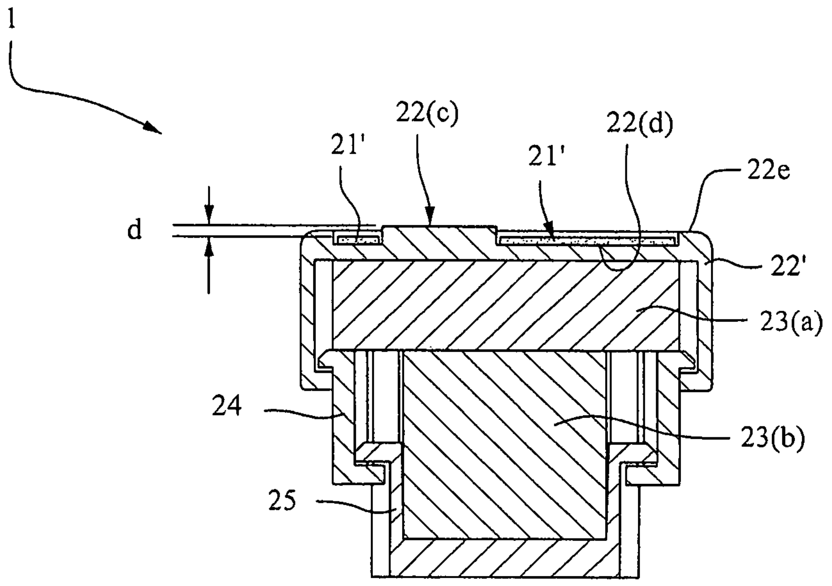

FIGS. 14(*a*)-(*b*) are perspective views illustrating that the deadbolt cushioning structure 1, 1', 1" of any of FIGS. 1-8 may be used on a door frame in combination with a latch cushioning structure 60, 63' of any of FIGS. 9-13 in example embodiments of this invention. Alternatively the deadbolt cushioning structure 1, 1' or 1" may be used without the latch cushioning structure 60, 63, or vice versa, in certain example embodiments of this invention.

There are variations in manufacturing tolerances for how far out of the mortise in the door that the latch extends. The latch can be somewhat inside the mortise or it can be somewhat outside the mortise. This can result in the latch 14 protruding too far out of the door mortise which in turn can cause the non-beveled part of the latch to hit squarely on the strike plate 12, 12*a* and miss the start of the bevel on the latch. This can result in the door not latching and securing properly. The latch cushioning structures 60, 63' discussed above address and resolve this problem.

Doors that have self-closing spring hinges or door closers are usually set by the installer to close faster, or harder, to overcome the resistances and the net effect is that the doors slam into a closed position. This can cause noticeable increased noise from the slamming of the doors on to the frames. Where the frames are hollow, the increase in noise is dramatic. This in turn creates noise complaints by guests in perhaps hotels. Again, the latch cushioning structures 60, 63' discussed above address and resolve this problem.

Doors not closing easily and not latching easily can reduce the intended locking of the door to maintain security and safety for an occupant. To overcome all these problems it would be desirable to have a spring biased latch 14 begin to withdraw in to the door mortise before the latch meets the strike plate. Highly desirable would be for the latch to withdraw completely so that only the top of the latch meets the angle of the strike plate and then slides noiselessly and quietly in to the cavity of the strike plate. The latch cushioning structures 60, 63' discussed above address these issues and are advantageous in these respects.

Because of the tolerance variations the latch cushioning structures 60, 63' have an adjustable bevel to accommodate variances. A base and/or a top housing pivots to change the bevel or angle via changing the angle/orientation of the latch engaging surface. The base can be attached to the frame with screws or self-adhesive both. The pivot point can be a continuous dowel, a short pin or a male pip and a hole on the base or the other way around. Securing the angle could be by a set screw or a male pip (or several pips) engaging a series of females holes, as discussed above. These could be on the side or in the rear. A screw could positioned in the sides or the rear.

The front end of the latch engaging surface 63, 64 extends outward so that it can be position near or on top of the angle of the lip of the strike plate. The base may have snap on or a glued on elevator of varying heights to accommodate different heights of strike plate by different manufacturers. The elevators could be flat or on angles and this could affix to the base by snapping on, adhesives, or the like.

One could design a fixed latch assist that might accommodate some or a multitude of issues, but it would be desirable to be able to field adjust for variations by having one of more of the features incorporated in the proposed design.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A deadbolt cushioning system comprising:

a deadbolt cushioning structure attached to a surface of a door frame, and configured so that when a door with a fully extended deadbolt closes from a wide open position toward a closed position the extended deadbolt impacts the deadbolt cushioning structure, the deadbolt cushioning structure for preventing the extended deadbolt from impacting the door frame and for preventing the extended deadbolt from reaching a strike plate attached to the door frame, wherein the surface of the door frame to which the deadbolt cushioning structure is attached does not support the strike plate and is perpendicular to another surface of the door frame that supports the strike plate;

wherein the deadbolt cushioning structure includes a first housing and second housing with a biasing structure provided therebetween, the biasing structure comprising foam and/or a spring;

wherein the first housing is affixed to a face of the door frame; and wherein the second housing is slidable relative to the first housing, so that when the deadbolt impacts the deadbolt cushioning structure the biasing structure compresses and the second housing slides relative to the first structure and moves toward the face of the door frame to which the first housing is affixed and wherein the second housing is positioned to stop the extended deadbolt before the extended deadbolt reaches the strike plate.

2. The deadbolt cushioning system of claim 1, wherein the biasing structure comprises foam.

3. The deadbolt cushioning system of claim 1, wherein the biasing structure comprises at least one spring.

4. The deadbolt cushioning system of claim 1, wherein the biasing structure comprises a plurality of springs.

5. The deadbolt cushioning system of claim 1, further comprising a third housing located between the first and second housings, wherein the biasing structure is located in both a cavity of the second housing and in a cavity of the third housing, and wherein the third housing is slidable relative to the first housing.

6. The deadbolt cushioning system of claim 1, further comprising a top plate insert that is provided at an upper surface of the second housing.

7. The deadbolt cushioning system of claim 6, wherein the top plate insert is substantially continuously provided across a major top surface of the second housing.

8. The deadbolt cushioning system of claim 6, wherein the top plate-like insert has an aperture defined therein which receives a projection of the second housing that protrudes from the second housing and through said aperture, the projection of the second housing that extends through said aperture being adapted to receive impacts from the deadbolt.

9. The deadbolt cushioning system of claim 1, wherein the biasing structure comprises a first portion comprising foam and a second portion comprising foam, and wherein the second portion comprising foam is located closer to the first housing than is the first portion comprising foam, and wherein the second portion comprising foam has a higher density and thus less compression upon deadbolt impact than does the first portion comprising foam.

10. The deadbolt cushioning system of claim 9, wherein the first portion comprising foam is plate-like in shape and is provided across substantially an entirety of a major surface of the second housing, and where the second portion comprising foam is located on and supported by the first portion comprising foam.

11. The deadbolt cushioning system of claim 9, wherein the second portion comprising foam protrudes into an aperture defined in the first portion comprising foam.

12. The deadbolt cushioning system of claim 11, wherein each of the first and second portions comprising foam contact a major surface of the second housing.

13. A deadbolt cushioning structure adapted to be attached to a surface of a door frame, so that when a door with a fully extended deadbolt closes from a wide open position toward a closed position the extended deadbolt impacts the deadbolt cushioning structure, the deadbolt cushioning structure for preventing the extended deadbolt from impacting the door frame and for preventing the extended deadbolt from impacting a strike plate attached to the door frame, the deadbolt cushioning structure comprising:

a first housing and second housing with a biasing structure provided therebetween;

the first housing adapted to be affixed to a face of the door frame, wherein the surface of the door frame to which the deadbolt cushioning structure is to be attached does not support the strike plate and is perpendicular to another surface of the door frame that is configured to support the strike plate;

wherein the second housing is slidable relative to the first housing, so that when the deadbolt impacts the deadbolt cushioning structure the biasing structure is configured to compress and the second housing is configured to slide relative to the first structure and move toward the face of the door frame to which the first housing is to be affixed.

14. The deadbolt cushioning structure of claim 13, wherein the biasing structure comprises foam.

15. The deadbolt cushioning structure of claim 13, further comprising a third housing located between the first and second housings, wherein the biasing structure is located in both a cavity of the second housing and in a cavity of the third housing, and wherein the third housing is slidable relative to the first housing.

16. The deadbolt cushioning structure of claim 13, further comprising a top plate insert that is provided at an upper surface of the second housing.

17. The deadbolt cushioning structure of claim 16, wherein the top plate insert is substantially continuously provided across a major top surface of the second housing.

18. The deadbolt cushioning structure of claim 16, wherein the top plate insert has an aperture defined therein which receives a projection of the second housing that protrudes from the second housing and through said aperture, the projection of the second housing that extends through said aperture being adapted to receive impacts from the deadbolt.

19. The deadbolt cushioning structure of claim 13, wherein the biasing structure comprises a first portion comprising foam and a second portion comprising foam, and wherein the second portion comprising foam is located closer to the first housing than is the first portion comprising foam, and wherein the second portion comprising foam has a higher density and thus less compression upon deadbolt impact than does the first portion comprising foam.

20. The deadbolt cushioning system of claim 19, wherein the first portion comprising foam is provided across substantially an entirety of a major surface of the second housing, and where the second portion comprising foam is located on and supported by the first portion comprising foam.

21. The deadbolt cushioning system of claim 19, wherein the second portion comprising foam protrudes into an aperture defined in the first portion comprising foam.

* * * * *